(12) United States Patent
Cohen

(10) Patent No.: US 9,087,270 B2
(45) Date of Patent: *Jul. 21, 2015

(54) INTERACTIVITY VIA MOBILE IMAGE RECOGNITION

(71) Applicant: Nant Holdings IP, LLC, Culver City, CA (US)

(72) Inventor: Ronald H. Cohen, Pasadena, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 13/915,731

(22) Filed: Jun. 12, 2013

(65) Prior Publication Data

US 2013/0272574 A1      Oct. 17, 2013

Related U.S. Application Data

(60) Division of application No. 13/069,157, filed on Mar. 22, 2011, now Pat. No. 8,817,045, which is a division of application No. 11/510,009, filed on Aug. 25, 2006, now Pat. No. 8,130,242, which is a (Continued)

(51) Int. Cl.
*G06K 9/60* (2006.01)
*G06K 9/62* (2006.01)

(Continued)

(52) U.S. Cl.
CPC ............. *G06K 9/6217* (2013.01); *G06K 9/228* (2013.01); *G06K 9/4652* (2013.01); *G06K 9/6203* (2013.01); *G06K 9/78* (2013.01);

(Continued)

(58) Field of Classification Search
USPC ........ 382/100, 165, 181, 305; 705/26.1–27.2; 725/60–61
See application file for complete search history.

(56) References Cited

U.S. PATENT DOCUMENTS 5,241,671 A    8/1993  Reed et al.
5,317,689 A    5/1994  Nack et al.
(Continued)

FOREIGN PATENT DOCUMENTS

EP    0967574 A2    12/1999
EP    1424111 A2     6/2004
(Continued)

OTHER PUBLICATIONS

Rosenberg, L, "A Method and Apparatus for an On-screen/Off-screen First Person Gaming Experience", Mar. 31, 2005.
(Continued)

*Primary Examiner* — Ishrat I Sherali
(74) *Attorney, Agent, or Firm* — Fish & Tsang, LLP

(57) ABSTRACT

Systems and methods of interacting with a virtual space, in which a mobile device is used to electronically capture image data of a real-world object, the image data is used to identify information related to the real-world object, and the information is used to interact with software to control at least one of: (a) an aspect of an electronic game; and (b) a second device local to the mobile device. Contemplated systems and methods can be used to gaming, in which the image data can be used to identify a name of the real-world object, to classify the real-world object, identify the real-world object as a player in the game, to identify the real-world object as a goal object or as having some other value in the game, to use the image data to identify the real-world object as a goal object in the game.

54 Claims, 2 Drawing Sheets

Related U.S. Application Data continuation-in-part of application No. 11/294,971, filed on Dec. 5, 2005, now Pat. No. 7,403,652, which is a continuation of application No. 09/992,942, filed on Nov. 5, 2001, now Pat. No. 7,016,532.

(60) Provisional application No. 60/317,521, filed on Sep. 5, 2001, provisional application No. 60/246,295, filed on Nov. 6, 2000, provisional application No. 60/712,590, filed on Aug. 29, 2005.

(51) Int. Cl.
| | |
|---|---|
| G06K 9/22 | (2006.01) |
| G06K 9/46 | (2006.01) |
| G06K 9/78 | (2006.01) |
| G06T 19/00 | (2011.01) |
| G06F 3/01 | (2006.01) |
| G09G 5/14 | (2006.01) |
| H04M 1/725 | (2006.01) |

(52) U.S. Cl.
CPC ............ *G06T 19/00* (2013.01); *G06T 19/006* (2013.01); *G06F 3/011* (2013.01); *G09G 5/14* (2013.01); *H04M 1/72544* (2013.01)

(56) References Cited

U.S. PATENT DOCUMENTS

| | | | |
|---|---|---|---|
| 5,576,950 | A | 11/1996 | Tonomura et al. |
| 5,742,521 | A | 4/1998 | Ellenby et al. |
| 5,742,815 | A | 4/1998 | Stern |
| 5,926,116 | A | 7/1999 | Kitano et al. |
| 5,945,982 | A | 8/1999 | Higashio et al. |
| 6,009,204 | A | 12/1999 | Ahmad |
| 6,031,545 | A | 2/2000 | Ellenby et al. |
| 6,037,936 | A | 3/2000 | Ellenby et al. |
| 6,084,590 | A | 7/2000 | Robotham et al. |
| 6,085,256 | A | 7/2000 | Kitano et al. |
| 6,175,343 | B1 | 1/2001 | Mitchell et al. |
| 6,307,556 | B1 | 10/2001 | Ellenby et al. |
| 6,414,696 | B1 | 7/2002 | Ellenby et al. |
| 6,502,000 | B1 | 12/2002 | Arnold et al. |
| 6,522,889 | B1 | 2/2003 | Aarnio |
| 6,604,049 | B2 | 8/2003 | Yokota |
| 6,674,993 | B1 | 1/2004 | Tarbouriech |
| 6,750,848 | B1 | 6/2004 | Pryor |
| 6,765,572 | B2 | 7/2004 | Roelofs |
| 6,771,294 | B1 | 8/2004 | Pulli et al. |
| 6,795,041 | B2 | 9/2004 | Ogawa et al. |
| 6,951,515 | B2 | 10/2005 | Ohshima et al. |
| 6,972,734 | B1 | 12/2005 | Ohshima et al. |
| 7,016,532 | B2 * | 3/2006 | Boncyk et al. ............ 382/165 |
| 7,119,817 | B1 | 10/2006 | Kawakami |
| 7,156,773 | B2 | 1/2007 | Takai et al. |
| 7,283,983 | B2 | 10/2007 | Dooley et al. |
| 7,324,081 | B2 | 1/2008 | Friedrich et al. |
| 7,334,728 | B2 * | 2/2008 | Williams .................... 235/383 |
| 7,471,301 | B2 | 12/2008 | Lefevre |
| 7,775,437 | B2 * | 8/2010 | Cohen ..................... 235/462.45 |
| 7,903,838 | B2 | 3/2011 | Hudnut et al. |
| 8,386,918 | B2 * | 2/2013 | Do et al. .................... 715/230 |
| 8,483,715 | B2 * | 7/2013 | Chen ........................ 455/456.3 |
| 8,817,045 | B2 * | 8/2014 | Cohen ......................... 345/633 |
| 8,903,430 | B2 * | 12/2014 | Sands et al. ................ 455/457 |
| 2002/0061781 | A1 | 5/2002 | Tonomura |
| 2002/0090985 | A1 | 7/2002 | Tochner et al. |
| 2002/0112249 | A1 | 8/2002 | Hendricks et al. |
| 2002/0140745 | A1 | 10/2002 | Ellenby et al. |
| 2002/0190947 | A1 | 12/2002 | Feinstein |
| 2003/0005439 | A1 | 1/2003 | Rovira |
| 2003/0155413 | A1 | 8/2003 | Kovesdi et al. |
| 2003/0218638 | A1 | 11/2003 | Goose et al. |
| 2004/0002843 | A1 | 1/2004 | Robarts et al. |
| 2004/0031058 | A1 | 2/2004 | Reisman |
| 2004/0041788 | A1 | 3/2004 | Ternullo |
| 2004/0109009 | A1 | 6/2004 | Yonezawa et al. |
| 2004/0192366 | A1 | 9/2004 | Lai et al. |
| 2005/0007384 | A1 | 1/2005 | Yamada et al. |
| 2005/0009608 | A1 | 1/2005 | Robarts et al. |
| 2005/0168486 | A1 | 8/2005 | Sato et al. |
| 2005/0231419 | A1 | 10/2005 | Mitchell |
| 2005/0252984 | A1 | 11/2005 | Ahmed |
| 2005/0264555 | A1 | 12/2005 | Zhou et al. |
| 2005/0285878 | A1 | 12/2005 | Singh et al. |
| 2005/0289590 | A1 | 12/2005 | Cheok et al. |
| 2006/0038833 | A1 | 2/2006 | Mallinson et al. |
| 2006/0066573 | A1 | 3/2006 | Matsumoto |
| 2006/0152489 | A1 | 7/2006 | Sweetser et al. |
| 2006/0223635 | A1 | 10/2006 | Rosenberg |
| 2006/0241792 | A1 | 10/2006 | Pretlove et al. |
| 2006/0241793 | A1 | 10/2006 | Skourup et al. |
| 2006/0277474 | A1 | 12/2006 | Robarts et al. |
| 2007/0273644 | A1 | 11/2007 | Mondine |
| 2008/0021953 | A1 | 1/2008 | Gil |
| 2008/0189185 | A1 | 8/2008 | Matsuo et al. |
| 2008/0194323 | A1 | 8/2008 | Merkli et al. |
| 2009/0102859 | A1 | 4/2009 | Athsani et al. |
| 2010/0045700 | A1 | 2/2010 | Lefevre et al. |
| 2010/0060632 | A1 | 3/2010 | Lefevre et al. |
| 2010/0106720 | A1 | 4/2010 | Chao et al. |
| 2010/0134601 | A1 | 6/2010 | Lefevre et al. |
| 2010/0220891 | A1 | 9/2010 | Lefevre et al. |
| 2010/0277468 | A1 | 11/2010 | Lefevre et al. |
| 2013/0013414 | A1 * | 1/2013 | Haff ......................... 705/14.64 |
| 2013/0046602 | A1 * | 2/2013 | Grigg et al. ............... 705/14.25 |

FOREIGN PATENT DOCUMENTS

| | | |
|---|---|---|
| GB | 2385486 A | 8/2003 |
| JP | H1166350 A | 3/1999 |
| JP | 2001087559 A | 4/2001 |
| JP | 2005143075 A | 6/2005 |
| WO | 9846323 A1 | 10/1998 |
| WO | 9967695 A2 | 12/1999 |
| WO | 0158547 A1 | 8/2001 |
| WO | 2009/112585 | 9/2009 |
| WO | 2009/112586 | 9/2009 |

OTHER PUBLICATIONS

Russell B., "Use Your Phone as a Golf Club," MobHappy, 1 page, [retrieved on Jan. 31, 2005]. Retrieved from the Internet:< URL: http:// mobhappy_typepad_com/russell_buckleys_mobhappy/2005/01/index.html>.

Snow B., "GPS Gaming," Joystiq.com, 1 page, [retrieved on Feb. 24, 2006]. Retrieved from the Internet:< URL: http:// www.joystiq.com/20061021241gps-gaming/>.

Supplementary European Search Report for Application No. EP06790088, mailed on May 26, 2011, 11 pages.

Welle D., "Virtual Graffiti—A Sign of the Future?," 2 pages, [retrieved on Feb. 14, 2005]. Retrieved from the Internet:< URL: http://www. dw-world.de/dw/article/0,1564,1481993,00.html>.

* cited by examiner

INTERACTIVITY VIA MOBILE IMAGE RECOGNITION

This application is a divisional of Ser. No. 13/069,157, filed Mar, 22, 2011, which is a divisional of Ser. No. 11/510,009 filed Aug. 25, 2006 and issued as U.S. Pat. No. 8,130,242 on Mar. 6, 2012, which claims the benefit of U.S. provisional application No. 60/712,590, filed Aug. 29, 2005, and is a continuation-in-part of Ser. No. 11/294,971, filed Dec. 5, 2005 and issued as U.S. Pat. No. 7,403,652 on Jul. 22, 2008, which is a continuation of Ser. No. 09/992,942, filed Nov. 5, 2001 and issued as U.S. Pat. No. 7,016,532 on Mar. 21, 2006, which claims priority to U.S. provisional application No. 60/317,521, filed Sep. 5, 2001 and U.S. provisional application No. 60/246,295, filed Nov. 6, 2000. All of the above-listed applications are incorporated herein by reference.

FIELD OF THE INVENTION

The invention pertains to the field of mobile networks, mobile devices such as telephones, and information provided to and from users through such devices.

BACKGROUND OF THE INVENTION

U.S. Pat. No. 7,016,532 to Boncyk et al., issued Mar. 21, 2006, and incorporated herein by reference in its entirety, describes a method and process through which individuals can use their cell phones, PDAs and the like to take digital images of two and three dimensional objects, the image(s) or information derived from the image(s) can be sent to a distal server, and the server can use the transmitted information to identify an object within the image. Having identified the object the server can then provide additional information (telephone number, address, web links, and so forth) back to the individual taking the digital image. That person, in turn, can use the additional information in any suitable manner, such as to execute a purchase, surf the Internet, and so forth.

It is also known to use one's phone to interact in limited ways with a virtual game world.

For example, a cell phone can be used as a golf club to interact with a virtual golf course. http://mobhappy.typepad-.com/russell_buckleys_mobhappy/2005/01/index.html. As another example, a cell phone can be used to play a virtual treasure hunt, http://www.joystiq.com/2006/02/24/gps-gaming/, and to leave or find virtual graffiti,http://www.dw-world.de/dw/article/0,15641481993,00.html.

What has not been appreciated, however, is that a camera enabled mobile device can be used in concert with software to identify information related to real-world objects, and then use that information to control either (a) an aspect of an electronic game, or (b) a second device local to the mobile device.

SUMMARY OF THE INVENTION

The present invention provides systems, methods, and apparatus in which a camera enabled mobile device is used in concert with software to identify information related to real-world objects, and then use that information to control either (a) an aspect of an electronic game, or (b) a second device local to the mobile device.

In contemplated uses, the other inputs can be almost anything, including for example, a password, use of a button as a trigger of a pretend weapon, checking off steps in a treasure hunt, playing a video game that has both real-world and virtual objects, voting, and so forth.

The combination of real world situation and virtual world situation can also be almost anything. For example, the real world situation can vary from relatively static (such as an advertisement in a magazine) to relatively dynamic (such as cloud formations, images on a television set, location of a person or automobile). Moreover, the virtual world situation can independently vary from relatively static (such as an option to purchase virtual money or other resources) to relatively dynamic (such as the positions of virtual characters in a video game).

Preferred embodiments of the inventive subject matter of this application include the following steps. Steps 1 and 2 of this process were disclosed in U.S. Pat. No. 7,016,532.

1) An information connection is established between a mobile device and an information resource (such as a web site) based on imagery captured by the mobile device. This is done by capturing an image of an object with the mobile device, sending the image to a distal server, recognizing the object in the server, and the server sending an information resource address to the mobile device.

2) The user obtains information from the information resource via the mobile device.

3) The user interacts with the information resources or object based on the previously established information connection. This interaction may be of various types, including for example:

Repeating the above process multiple times.
Performing a transaction.
Performing actions in a game.
Opening a door (physical or virtual) to gain access to secure information or a secure location.
Interacting with TV programming (including selecting a channel).
Communicating with other people.

DETAILED DESCRIPTION

Definitions

As used herein, the term "mobile device" means a portable device that includes image capture functionality, such as a digital camera, and has connectivity to at least one network such as a cellular telephone network and/or the Internet. The mobile device may be a mobile telephone (cellular or otherwise), PDA, or other portable device.

As used herein, the term "application" means machine-executable algorithms, usually in software, resident in the server, the mobile device, or both.

As used herein, the term "user" means a human being that interacts with an application.

As used herein, the term "server" means a device with at least partial capability to recognize objects in images or in information derived from images.

Figure 1:
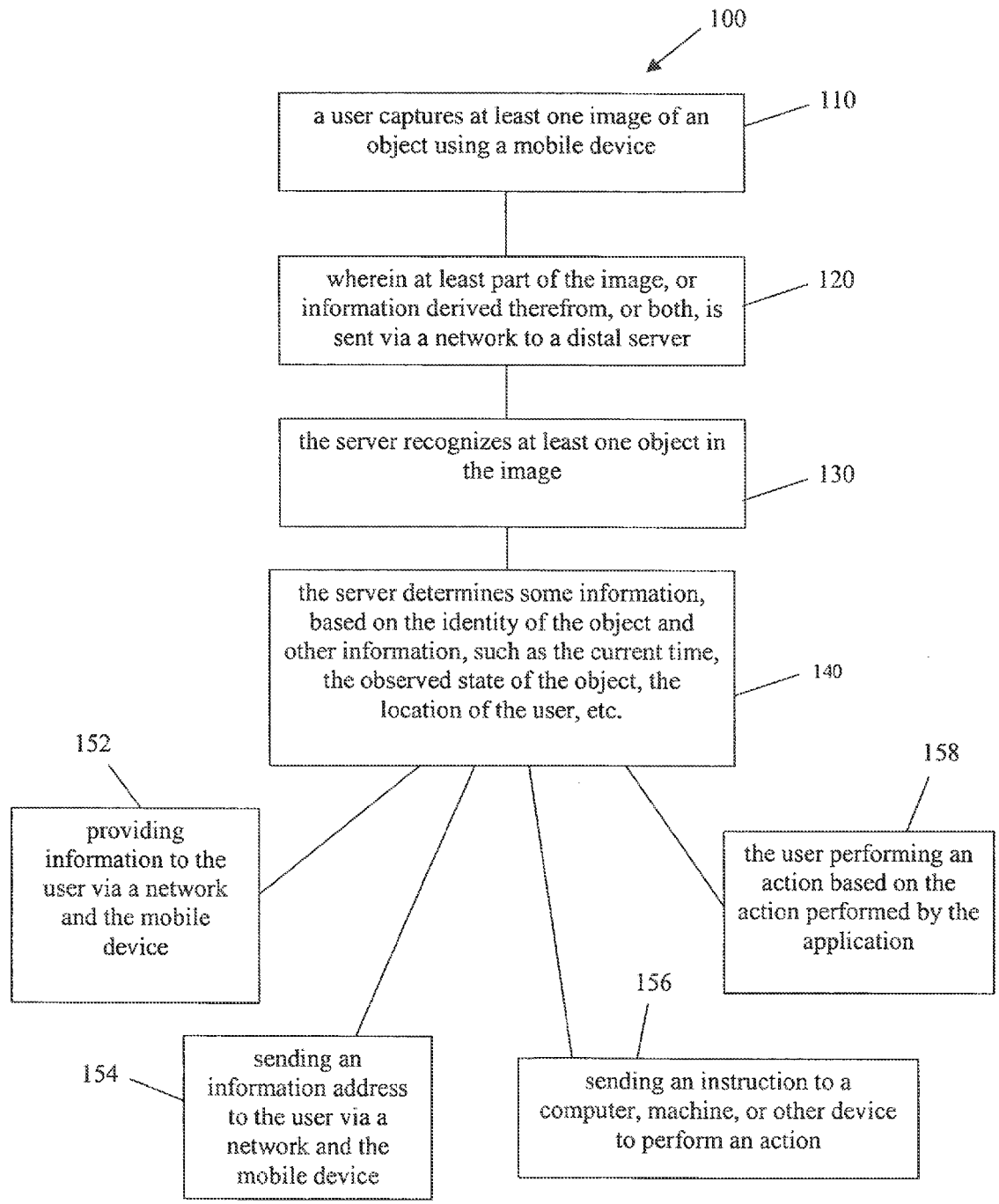
FIG. 1 is a schematic of an exemplary method according to one aspect of the inventive subject matter.

In FIG. 1, a first exemplary class of processes 100 includes: step 110 wherein a user captures at least one image of an object using a mobile device; step 120 wherein at least part of the image, or information derived therefrom, or both, is sent via a network to a distal server; step 130 wherein the server recognizes at least one object in the image; and step 140 wherein the server determines some information, based on the identity of the object and other information, such as the current time, the observed state of the object, the location of the user, etc. If the appearance of the object varies with time, then this time-varying appearance may be used in determination of the information. This time-varying appearance may furthermore be correlated with the current time in determining the information.

Other contemplated steps include step 152 of providing information to the user via a network and the mobile device; step 154 of sending an information address to the user via a network and the mobile device; step 156 of sending an instruction to a computer, machine, or other device to perform an action; and step 158 of the user performing an action based on the action performed by the application.

The above process may be repeated as many times as is desired or appropriate. The user may capture at least one additional image or provide other inputs to the server or to another device, based on the action performed by the application, thus beginning a new cycle.

Figure 2:
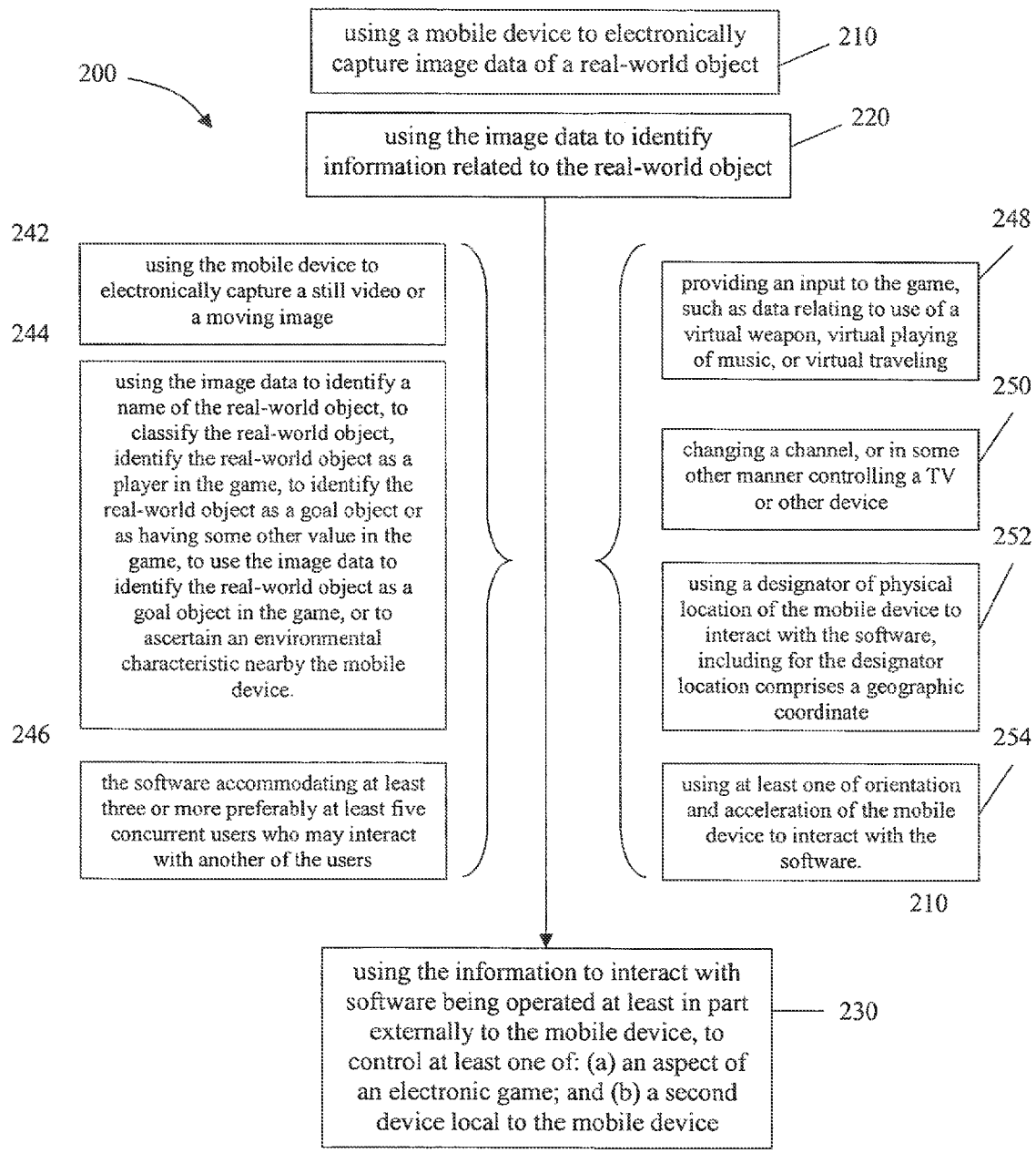
FIG. 2 is a schematic of an exemplary method according to another aspect of the inventive subject matter.

In FIG. 2, another class of methods 200 of interacting with a virtual space, comprises: step 210 of using a mobile device to electronically capture image data of a real-world object; step 220 of using the image data to identify information related to the real-world object; and step 230 of using the information to interact with software being operated at least in part externally to the mobile device, to control at least one of: (a) an aspect of an electronic game; and (b) a second device local to the mobile device.

Option steps collectively shown as 242 include using the mobile device to electronically capture a still video or a moving image.

Optional steps collectively shown as 244 include using the image data to identify a name of the real-world object, to classify the real-world object, identify the real-world object as a player in the game, to identify the real-world object as a goal object or as having some other value in the game, to use the image data to identify the real-world object as a goal object in the game, or to ascertain an environmental characteristic nearby the mobile device.

Optional steps collectively shown as 246 include the software accommodating at least three or more preferably at least five concurrent users who may interact with another of the users.

Optional steps collectively shown as 248 comprise providing an input to the game, such as data relating to use of a virtual weapon, virtual playing of music, or virtual traveling.

Optional steps collectively shown as 250 comprise changing a channel, or in some other manner controlling a TV or other device.

Optional steps collectively shown as 252 further comprise using a designator of physical location of the mobile device to interact with the software, including for the designator location comprises a geographic coordinate.

Optional steps collectively shown as 254 further comprise using at least one of orientation and acceleration of the mobile device to interact with the software.

EXAMPLES

In FIG. 1, a system includes a user who uses a cell phone or other mobile device to capture an image of an object. All practical objects are contemplated, including for example a cover of a CD (compact audio disk) or a visible image on a face of the CD, a DVD (digital video disk), a magazine advertisement, a consumer product, and so forth. Identification of the object is added to the user's online "shopping cart" in an online shopping application. The shopping cart represents a list of items that the user intends to purchase. The user then continues to shop by capturing images of additional objects that he either intends to purchase or about which he desires information.

A user deduces, from information in a game application, the identity, nature, and/or location of a "goal object" that he should find as a step in a game. The user then finds a "candidate object" that he believes to be either the goal object or another object that is either nearby the goal object or on the path to the goal object, or is otherwise related to his search for the goal object. The user captures an image of the candidate object with his cell phone. The image is sent to the server and recognized. If the candidate object is the goal object, the user obtains points in the game. If the candidate object is not the goal object but instead is on the path to or nearby the goal object, then the application may provide the user with A) information regarding his progress towards the goal object and/or B) a hint regarding how to progress towards the goal object. goal objects, reward points, hints, and various other aspects of such a game may be dynamic, so that the game changes with time, location, participants, participants' states and progress, and other factors.

A user captures an image of a building, store, statue, or other such "target object." Interactive content and/or information pertinent to the target object is provided to the user via the mobile device. The interactive content and/or information is created and/or modified based on the appearance of the target object. For example, advertisements for cold refreshments may be sent to the user based on the determining that the weather at the user's location is hot and sunny. Such determination of conditions at the user's location may be based on at least one of: A) the appearance of shadows in the image, B) temperature data obtained from weather information resources, C) the location of the mobile device as determined by Global Positioning System, radio frequency ranging and/or triangulation, or other means, D) the appearance of lights (e.g. street lights, neon signs, illuminated billboards, etc.), and E) current time.

A user wishes to gain access to a secure location, information resource, computing resource, or other such thing (the "secure resource") that is restricted from general public access. The user captures an image, with his mobile device, of the secure resource or an object, such as a sign, that is nearby or otherwise corresponds to the secure resource. The image is sent to a server. The server determines that the user wishes to gain access to the secure resource. The server sends a message to the user (via the mobile device), instructing the user to provide an image of the user's face and/or some other identifying thing. The user then captures an image of his face or other identifying thing and this image is sent to the server. The server validates the identity of the user by recognizing the user's face or other identifying thing in the image. The server then instructs the user to provide a password. The user provides the password, by speaking it into the mobile device, entering it into a keyboard on the mobile device, or entering it into a keyboard on another device (such as a keyboard attached to the secure resource), or other means. The password may vary depending on the secure resource, the identity of the user, the current time, and other factors. The server or another device then grants or denies the user access to the secure resource based on verification of the password, current time, user identity, user location, secure resource location, and/or other factors.

A game involving simulated shooting of a weapon may be provided as follows. A user points his mobile device at an object that he wishes to shoot. The user sees, in the screen display of his mobile device, a simulated view of using a weapon. For example, the user may see the crosshairs of an aiming sight superimposed on the real-world scene in front of him. The user "shoots" a simulated weapon by pressing a button or making some other input (e.g. screen input or voice command) to the mobile device. The mobile device captures an image and sends it to the server. Other information may also be sent to the server in addition to the image. The application (comprising software on one or both of the server and mobile device) recognizes the object(s) in the image and correlates them to the simulated weapon aim point. The application then provides a simulation, on the mobile device screen, of the weapon firing. This simulation may be superimposed on the image of the real-world scene. Depending on various factors, the weapon may have various effects within the game, from no effect at all to completely destroying a simulated target. Such effects may be simulated via animation, video, and/or audio in the mobile device. Such effects may be generated in the server, mobile device, or both, or downloaded from the server or another computer. The result of the shooting the weapon may depend on various factors, including the identity of the objects in the image and the position of those objects relative to the user and relative to the weapon aimpoint.

Multiple users may simulate fighting against each other. In such a case, if a user shoots another user, then the mobile devices of each player would display appropriate outputs. For example, if one user (the "Victim") is shot by another, then the Victim's mobile device may produce animations and sound effects portraying the attack from the receiving side. The Victim may be have points (score, health, or otherwise) deducted from his game points due to such an attack. users within such a game, and their positions relative to other users and weapon aim points, may be determined via various means. Such means may include, for example, "bulls-eye" tags worn by users. In this case, for example, a Victim might only be successfully "shot" if bulls-eye symbol appears in the part of the image that corresponds the weapon aim point.

Other simulated weapons, such as swords, shields, missiles, projectiles, or beam weapons may also be used in such a game.

If orientation, acceleration, and/or positions sensor are included in the mobile device, then the orientation and/or acceleration of the mobile device may be used as inputs to an application such as a game. For example, a user may engage in simulated sword fighting by controlling his simulated sword through movement of his mobile device. Additional examples are flying, driving, or other simulators in which the user controls a simulated object via motion of his mobile device. In such games, the game may be displayed by the mobile device or some other device, such as a television or computer. In this case, the mobile device serves, in essence, as a mouse, joystick, drawing pen, or other manual input device to a computing system. The orientation and/or acceleration sensors may be internal to the mobile device or may be implemented completely or partially external to the mobile device (for example, using radio-frequency or magnetic position determination).

A user may use his mobile device to interact with content, where "content" means electronically provided programming, games, or other information. Example of content in this context are: television programs, computer games, video games, radio programs, motion pictures, music, news programs, etc. In this application, the user captures an image of at least one object, an object in the image is recognized by a server, and then based on the identity of the object, and optionally also the identity of the user, the current time, and other such factors, the content is modified.

An example of such usage is a user capturing an image of an advertisement or other item in a magazine or newspaper and thus causing his television to receive content appropriate to the item. This may be accomplished by the server sending a message A) to the user's television, instructing the television to change the channel or B) to another server or computing system that in turn sends content to the user's television. This process may be accomplished not only through television but also through any device capable of providing content to the user, including for example, a computer, a radio, an audio device, or a game device.

After the user has initiated reception of the content, he may continue to interact with the content via capture of further images, motion of the mobile device, or other inputs. For example, a user may capture an image of an electronic billboard (or other electronic display). The server recognizes the image on the billboard and then establishes a communication path between the user and the computer that controls the billboard. The billboard may then display new and interactive content to the user, including visual and audio content. The user may interact with this content, via the billboard, through further image capture and/or motion of the mobile device. The content in such interaction may be provided to the user through the billboard, the mobile device, or any combination of thereof. Such interaction may be used for advertising (e.g. via a billboard), entertainment (e.g. via a computer, television, or other such device with audio and/or video display capability), work, study, etc. Such interaction may also be used for interactive machines, such as vending machines, ticket machines, information kiosks, etc.

Multiple users can interact with each other. users can be connected together in a virtual space, community, or environment by having "linked" to content based on "starting points" (real world physical objects) that are in some way related.

For example, several users could link to each other, by capturing images of the same billboard (interactive or otherwise). These users could then participate in the same interactive experience that is being displayed on the billboard and/or on their mobile devices. These users would generally be in physical proximity to each other. An example would be the spectators at a sports event interacting with the event via their mobile devices by having "clicked" (captured images) of the scoreboard or other display. Another example is multiple users in front of the same dynamic display (e.g. large screen display) and interacting with both the display content and each other. users at a meeting or convention can cast votes or otherwise interact with the group and other users.

Users may similarly participate in a common virtual environment even though they are not physically close to each other. An example would be multiple users "clicking" on (capturing images of) the same type of beverage bottle and thus being connected together. Another example would be multiple users "clicking" on a television program or Internet-based program and similarly being connected together. users at meetings can interact with other users that might not be in physical attendance but are attending via electronic connection. Remote attendees (not physically present) of such a meeting can also interact with the meeting in general.

Users may interact directly with television or other such audio/video content. This is accomplished by capturing an image of an object, recognizing the object in a server, and then connecting the user to a computing system that interacts with both the user and the content. For example, users may "click" on (capture an image of) the image of a television program on their television screen. Based on recognition of what is on the screen, they are then connected to a computing system that interacts with the television program. In this manner, the users can interact with the television program by, for example, voting for participants, voting for or otherwise selecting the next steps in a story or the desired outcome, playing the role of a character in a story, etc. This technique may be applied to not only television, but also any other form of electronically provided entertainment, such as digital motion pictures, and computer games.

Thus, specific embodiments and applications have been disclosed in which a camera enabled mobile device is used in concert with software to identify information related to real-world objects, and then use that information to control either (a) an aspect of an electronic game, or (b) a second device local to the mobile device. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of assessing environmental characteristics, the method comprising:
   capturing, via a mobile device, video representing a surrounding environment;
   analyzing, the surrounding environment represented in the video for at least one identifying object indicative of an environmental characteristic;
   identifying, via object recognition, the at least one identifying object indicative of an environmental characteristic within the surrounding environment; and
   providing information associated with the environmental characteristic to a user of the mobile device via an information address.

2. The method of claim 1, wherein the mobile device comprises a camera capable of image and/or video capture.

3. The method of claim 1, wherein the video comprises at least one real-world object.

4. The method of claim 1, wherein the at least one identifying object is associated with a real-world object.

5. The method of claim 4, wherein the real-world object is an advertisement.

6. The method of claim 4, wherein the real-world object is a consumer product.

7. The method of claim 1, wherein the at least one identifying object indicative of an environmental characteristic is a cover.

8. The method of claim 7, wherein the cover is a disc cover.

9. The method of claim 1, wherein the at least one identifying object indicative of an environmental characteristic is a goal object.

10. The method of claim 1, wherein the at least one identifying object indicative of an environmental characteristic is a candidate object.

11. The method of claim 1, wherein the information associated with the environmental characteristic is dependent on other information.

12. The method of claim 11, wherein the other information comprises at least one of the following: a current time, an observed state of the object, and a location of the user.

13. The method of claim 1, wherein the information associated with the environmental characteristic is presented to the user on a display of the mobile device as a virtual object superimposed on the video representing the surrounding environment.

14. The method of claim 13, wherein the virtual object is interactive.

15. The method of claim 13, wherein the virtual object provides information associated with a consumer product.

16. The method of claim 1, further comprising presenting the user with an option to purchase at least one of a product or a service.

17. The method of claim 1, further comprising enabling a transaction based on the content information.

18. The method of claim 1, further comprising conducting a transaction that includes the step of transmitting purchase information from the mobile device.

19. A mobile device configured to assess environmental characteristics comprising:
   a camera configured to capture video representing a surrounding environment;
   an image processing platform configured to:
      analyze the video to determine whether the video includes at least one indentifying object indicative of an environmental characteristic;
      identify, via object recognition, the at least one identifying object indicative of an environmental characteristic within the surrounding environment; and
      provide to the user of the mobile device, via the mobile device through an information address, information associated with the environmental characteristic.

20. The mobile device of claim 19, wherein the camera is configured to capture at least one of an image and the video.

21. The mobile device of claim 19, wherein the video comprises at least one real-world object.

22. The mobile device of claim 19, wherein the at least one identifying object is associated with a real-world object.

23. The mobile device of claim 22, wherein the real-world object is an advertisement.

24. The mobile device of claim 22, wherein the real-world object is a consumer product.

25. The mobile device of claim 22, wherein the at least one identifying object indicative of an environmental characteristic is a cover.

26. The mobile device of claim 25, wherein the cover is a disc cover.

27. The mobile device of claim 19, wherein the at least one identifying object indicative of an environmental characteristic is a goal object.

28. The mobile device of claim 19, wherein the at least one identifying object indicative of an environmental characteristic is a candidate object.

29. The mobile device of claim 19, wherein the information associated with the environmental characteristic is dependent on other information.

30. The mobile device of claim 29, wherein the other information comprises at least one of the current time, the observed state of the object, or the location of the user.

31. The mobile device of claim 19, wherein the information associated with the environmental characteristic is presented to the user on a display of the mobile device as a virtual object superimposed on the video representing the surrounding environment.

32. The mobile device of claim 31, wherein the virtual object is interactive.

33. The mobile device of claim 31, wherein the virtual object provides information associated with a consumer product.

34. The mobile device of claim 19, further comprising presenting the user with an option to purchase at least one of a product or a service.

35. The mobile device of claim 19, further comprising enabling a transaction based on the content information.

36. The mobile device of claim 19, further comprising conducting a transaction that includes the step of transmitting purchase information from the mobile device.

37. A computer program product comprising non-transitory computer readable medium storing instructions that cause a processor to execute the steps of:
   capturing, via a mobile device, video representing a surrounding environment;
   analyzing, the surrounding environment represented in the video for at least one identifying object indicative of an environmental characteristic;
   identifying, via object recognition, the least one identifying object indicative of an environmental characteristic within the surrounding environment; and
   providing information associated with the environmental characteristic to a user of the mobile device via an information address.

38. The computer program product of claim 37, wherein the mobile device comprises a camera configured to capture at least one of an image and the video.

39. The computer program product of claim 37, wherein the video comprises at least one real-world object.

40. The computer program product of claim 37, wherein the at least one identifying object is associated with a real-world object.

41. The computer program product of claim 40, wherein the real-world object is an advertisement.

42. The computer program product of claim 41, wherein the real-world object is a consumer product.

43. The computer program product of claim 40, wherein the at least one identifying object indicative of an environmental characteristic is a cover 44. The computer program product of claim 43, wherein the cover is a disc cover.

45. The computer program product of claim 43, wherein the target object represents at least one of the following: a building, a store, a vehicle, a media box, a person, a passport, a driver's license, a poster, an advertisement, on-screen content, a product, a beverage, a sign, a newspaper, a magazine, a radio frequency, and a machine part.

46. The computer program product of claim 37, wherein the at least one identifying object indicative of an environmental characteristic is a goal object.

47. The computer program product of claim 37, further comprising the step of obtaining other information associated with the environmental characteristic.

48. The computer program product of claim 47, wherein the other information comprises at least one of the current time, the observed state of the object, or the location of the user.

49. The computer program product of claim 37, wherein the information associated with the environmental characteristic is presented to the user on a display of the mobile device as a virtual object superimposed on the video representing the surrounding environment.

50. The computer program product of claim 38, wherein the virtual object is interactive.

51. The computer program product of claim 38, wherein the virtual object provides information associated with a consumer product.

52. The computer program product of claim 37, further comprising the step of presenting the user with an option to purchase at least one of a product or a service.

53. The computer program product of claim 37, further comprising the step of enabling a transaction based on the content information.

54. The computer program product of claim 37, further comprising the step of conducting a transaction that includes the step of transmitting purchase information from the mobile device.

* * * * *